US008688285B2

(12) United States Patent
Tanaka et al.

(10) Patent No.: US 8,688,285 B2
(45) Date of Patent: Apr. 1, 2014

(54) TOTAL ENERGY LIMITING AND CONTROLLING DEVICE, AND TOTAL ELECTRIC POWER LIMITING AND CONTROLLING DEVICE AND METHOD (75) Inventors: Masato Tanaka, Tokyo (JP); Mayumi Miura, Tokyo (JP)

(73) Assignee: Azbil Corporation, Tokyo (JP)

( * ) Notice: Subject to any disclaimer, the term of this patent is extended or adjusted under 35 U.S.C. 154(b) by 343 days.

(21) Appl. No.: 13/208,444

(22) Filed: Aug. 12, 2011

(65) Prior Publication Data

US 2012/0053747 A1    Mar. 1, 2012

(30) Foreign Application Priority Data

Aug. 27, 2010    (JP) .................................. 2010-190533

(51) Int. Cl.
*G05D 17/00*    (2006.01)
(52) U.S. Cl.
USPC .............................. 700/295; 705/80; 327/309
(58) Field of Classification Search
USPC .............................. 700/295; 705/80; 327/309
See application file for complete search history.

(56) References Cited

U.S. PATENT DOCUMENTS

| 4,768,066 | A | * | 8/1988 | Ito ..................................... 355/55 |
| 5,059,880 | A | * | 10/1991 | Hiroi .............................. 318/610 |
| 6,311,091 | B1 | * | 10/2001 | Yamahira ......................... 700/11 |
| 6,959,219 | B2 | * | 10/2005 | Tanaka ............................ 700/33 |
| 2003/0216823 | A1 | * | 11/2003 | Tanaka ............................ 700/67 |
| 2010/0169227 | A1 | * | 7/2010 | Boss et al. ...................... 705/80 |

FOREIGN PATENT DOCUMENTS

| JP | 05-313702 | A | 11/1993 |
| JP | H7-212027 | A | 8/1995 |
| JP | 2885047 | B2 | 4/1999 |
| JP | H11-126743 | A | 5/1999 |
| JP | H11-204412 | A | 7/1999 |
| JP | 2003-330504 | A | 11/2003 |
| JP | 2004-9099 | A | 1/2004 |
| JP | 4426155 | B2 | 3/2010 |

OTHER PUBLICATIONS

Hiroi, "Fundamentals and applications of digital instrumentation control system"; Kogyougijutsusha, pp. 1156-159, Oct. 1987.
U.S. Appl. No. 14/025,045, filed Sep. 12, 2013.

* cited by examiner

*Primary Examiner* — Mohammad Ali
*Assistant Examiner* — Anthony Whittington
(74) *Attorney, Agent, or Firm* — Troutman Sanders LLP (57) ABSTRACT The total electric power limiting/controlling device comprises: a total allocated electric power inputting portion for receiving information on the total allocated electric power; a heating time estimating portion for estimating a heating time when an operating quantity of an individual controlled loop has been set from its present value to a specific output value; electric power limiting portions for estimating a required output that is the operating quantity that is required in order to change the controlled quantity for an individual loop in accordance with a change in a setting value during the heating time, for finding a required output wherein the electric power use total quantity does not exceed the total allocated electric power, and for setting, as an operating quantity output upper limit value for an individual controlled loop, the required output that has been found; and a controlling portion that is provided for each individual controlled loop.

4 Claims, 7 Drawing Sheets

TOTAL ENERGY LIMITING AND CONTROLLING DEVICE, AND TOTAL ELECTRIC POWER LIMITING AND CONTROLLING DEVICE AND METHOD

CROSS REFERENCE TO RELATED APPLICATIONS

The present application claims priority under 35 U.S.C. §119 to Japanese Patent Application No. 2010-190533, filed Aug. 27, 2010, which is incorporated herein by reference.

FIELD OF TECHNOLOGY

The present invention relates to a controlling device and controlling method for a multi-loop control system provided with a plurality of controlled loops, and, in particular, relates to a total energy limiting and controlling device and total electric power limiting and controlling device and method for performing control so that the quantity of energy used (for example, the quantity of electrical power used) in step-response control does not exceed a prescribed value that has been specified, and so that, insofar as is possible, setting value following performance is not lost.

BACKGROUND OF THE INVENTION

Given, for example, legislation arising from the global warming problem, there are demands for strengthened control of the quantity of energy used in factories and manufacturing lines. Because heat-producing equipment and air-conditioning equipment are facilities equipment that can consume a particularly large quantity of electricity, often the upper limit for the quantity of energy consumed is controlled so as to be kept lower than the maximum value in conventional equipment. For example, in facilities equipment that runs on electric power, the operations are performed in particular so that the quantity of electricity used will be within specific limitations prescribed by an electric power demand controlling system. In particular, there have been proposals for methods, such as described below, for limiting the total quantity of electric power that is supplied simultaneously at the time of startup in heat-producing equipment that is provided with a plurality of electric heaters (when heating up simultaneously the temperature in multiple areas wherein electric heaters are installed).

In the reflow equipment disclosed in Japanese Patent 2885047 ("JP '047"), in order to reduce the quantity of electric current consumed at the time of startup, the startup time bands are offsetted from each other so that one heater is started up after the thermal saturation of the vicinity of the previous heater. In the semiconductor wafer processing equipment disclosed in Japanese Unexamined Patent Application Publication H11-126743 ("JP '743"), electric power is provided while providing timing differences for the individual heaters, so as to not consume large quantities of electric power all at once at the time of equipment startup.

In the substrate processing device disclosed in Japanese Unexamined Patent Application Publication H11-204412 ("JP '412"), in order to reduce the maximum electric power that is provided at a given time from an electric power providing portion, a specific startup sequence is followed and each of the heat treating portions are started up sequentially, one at a time. In the heating device disclosed in JP '743, in order to prevent electric power damage due to an excessive consumption current at the time of starting up the equipment, first the electric power that is necessary for the heater that is positioned below a conveyor is provided, and the electric power that is applied to heaters that are positioned above the conveyor is controlled in order to control the total quantity of electrical power consumed so as to be below a specific value, and as the temperature within the furnace increases, the temperature is used as a switching parameter, to perform control so as to reduce the quantity of electrical power supplied to the heaters that are positioned below the conveyor.

In the technologies disclosed in JP '047, JP '743, JP '412 and Japanese Patent 4426155 ("JP '155"), in all cases the use of the method of supplying the electric power through providing timing differences to a plurality of heaters causes the heating efficiency to the poor, or in other words, there is a problem in that the following performance for a controlled quantity PV (temperature) in relation to the setting value SP in step response is poor.

Because there will always be some degree of variability in the time required in order to start up the equipment and in the electric power required at startup when electric power is supplied through providing time differences to a plurality of heaters in manufacturing equipment, it is necessary to perform the switching evaluations with surplus availability when starting up by providing time differences. Consequently, when starting up (heating up) heating equipment that is provided with, for example, four heating/controlling systems, when the heating/controlling systems are started up individually and sequentially, ultimately an amount of time that is no less than the time wherein the time for starting up one system has been multiplied by four will be used.

Moreover, in order to facilitate ease in the startup switching evaluation, innovations are considered wherein the electric power is supplied in a sequence that is determined for heaters at specific positions, as in the technology disclosed in JP '155. However, the technology disclosed in JP '155 is a method that is used only when starting up in exactly identical patterns, and cannot the apply when there are changes in the heating requirements depending on manufacturing conditions. The more the method diverges from the most efficient method, that is, the normal simultaneous heating wherein electric power is supplied simultaneously to the plurality of heaters, the greater the problems with either a reduction in heating efficiency or in limitations to applicability.

The present invention was created in order to solve the problems set forth above, and the object is to provide a total energy limiting and controlling device and total electric power limiting and controlling device and method able to perform control so that the quantity of energy used (for example, the quantity of electrical power used) in step-response control does not exceed a prescribed value that has been specified, and so that, insofar as is possible, setting value following performance is not lost.

SUMMARY OF THE INVENTION

A total energy limiting and controlling device according to the present invention includes allocated total energy inputting means for receiving allocated total energy information that specifies a quantity of energy used for a control actuator of a plurality of controlled loops $R_i$ (i=1 through n); controlled quantity change time estimating means for estimating a controlled quantity change time when an operating quantity $MV_i$ for an individual controlled loop $R_i$ has been set from a current value to a specific output value; energy limiting means for estimating a required output $MU_i$ that is the operating quantity that is required in order to change a controlled quantity $PV_i$ of an individual controlled loop $R_i$ by a quantity that is in accordance with a change in a setting value $SP_i$, over a controlled quantity change time, for calculating a total quantity for energy used, which is the total energy used for each control actuator, from the required output MUi, for retrieving a combination of the required outputs MUi so that the total quantity of energy used does not exceed the allocated total energy, and for setting, as an operating quantity output upper limit value OHi for the individual controlled loop Ri, the required output MUi that is ultimately obtained; and controlling means for calculating an operating quantity MVi, provided for each controlled loop Ri, through control calculations upon inputting of the setting value SPi and the control quantity PVi, for executing an upper limit process to limit the operating quantity MVi so as to be no higher than the operating quantity output upper limit value OHi, and for outputting the operating quantity MVi, after the upper limit process, to a control actuator of a corresponding controlled loop Ri.

Moreover, a total energy limiting and controlling device according to the present invention has total allocated electric power inputting means for receiving total allocated electric power PW information that specifies a quantity of electric power used for a control actuator of a plurality of controlled loops Ri ($i=1$ through $n$); controlled quantity change time estimating means for estimating a controlled quantity change time when an operating quantity MVi for an individual controlled loop Ri has been set from a current value to a specific output value; electric power limiting means for estimating a required output MUi that is the operating quantity that is required in order to change a controlled quantity PVi of an individual controlled loop Ri by a quantity that is in accordance with a change in a setting value SPi, over a controlled quantity change time, for calculating a total quantity TW for electric power used, which is the total electric power used for each control actuator, from the required output MUi, for retrieving a combination of the required outputs MUi so that the total quantity TW of electric power used does not exceed the total allocated electric power PW, and for setting, as an operating quantity output upper limit value OHi for the individual controlled loop Ri, the required output MUi that is ultimately obtained; and controlling means for calculating an operating quantity MVi, provided for each controlled loop Ri, through control calculations upon inputting of the setting value SPi and the control quantity PVi, for executing an upper limit process to limit the operating quantity MVi so as to be no higher than the operating quantity output upper limit value OHi, and for outputting the operating quantity MVi, after the upper limit process, to a control actuator of a corresponding controlled loop Ri.

Furthermore, a total energy limiting and controlling device according to the present invention includes allocated total electric power inputting means for receiving allocated total electric power PW information that specifies a quantity of electric power used for a control actuator of a plurality of controlled loops Ri ($i=1$ through $n$); controlled quantity change quantity calculating means for calculating a change quantity $\Delta PVi$ of a controlled quantity PVi for each controlled loop Ri from a setting value SPi after a change in the individual controlled loop Ri and the controlled quantity PVi prior to changing the setting value; controlled quantity change rate calculating means for calculating a change rate THi of the controlled quantity PVi from the operating quantity MVi prior to changing the setting value of the individual controlled loop Ri; heating time calculating means for estimating, from the change quantity $\Delta PVi$ and the change rate THi, a heating time TLi for each individual controlled loop Ri, when the operating quantity MVi for each controlled loop Ri has been set from the current value to a specific output value, and for calculating a heating time TL that is the largest value from among the heating times TLi; required output estimating means for estimating the required output MUi that is the operating quantity that is required in order to change the controlled quantity PVi of each controlled loop Ri by the change quantity $\Delta PVi$ during the heating time TL; total electric power use calculating means for calculating, from the required output MUi, the total quantity TW of electric power used, which is the sum of the electric powers used by the individual control actuators; search processing means for executing processing in the required output estimating means and the total electric power use calculating means, while sequentially changing the heating time TL, to search for combinations of required outputs MUi wherein the total quantity TW of electric power used does not exceed the allocated total electric power PW, and for setting, as an operating quantity output upper limit value OHi for each controlled loop Ri, the required output MUi that is ultimately obtained; and controlling means for calculating an operating quantity MVi, provided for each controlled loop Ri, through control calculations upon inputting of the setting value SPi and the control quantity PVi, for executing an upper limit process to limit the operating quantity MVi so as to be no higher than the operating quantity output upper limit value OHi, and for outputting the operating quantity MVi, after the upper limit process, to a control actuator of a corresponding controlled loop Ri.

Moreover, in one structural example of a total electric power limiting and controlling device as set forth in the present invention: the controlled quantity change rate calculating means calculate the change rate THi of the controlled quantity PVi, when the operating quantity MVi has been set from a present value to a specific output value, through converting the change rate of the controlled quantity PVi, at the time of a typical operating quantity output, by an operating increase quantity increase width that is a difference between the specific output value and the present value of the operating quantity MVi; and the required output estimating means use an equation obtained through solving an equation for calculating the change rate THi for an operating quantity output upper limit, to calculate the required output MUi.

Moreover, in one structural example of a total electric power limiting and controlling device as set forth in the present invention: the control quantity change rate calculating means calculate the change rate THi of the controlled quantity PVi through a first estimating polynomial equation, which is set in advance, with the operating quantity MVi prior to the change in setting value for the individual controlled loop Ri and the change quantity $\Delta PVi$ of the controlled quantity PVi as input variables; the required output estimating means calculate the required output MUi through a second estimating polynomial equation, which is set in advance, with the operating quantity MVi prior to the change in setting value for the individual controlled loop Ri, the change quantity $\Delta PVi$ of the controlled quantity PVi, and the heating time TL as input variables; the first estimating polynomial equation is derived in advance through multivariate analysis from experimental data for operating quantities MVi from prior to setting value changes, experimental data for operating quantity output upper limit values OHi, experimental data for change quantities $\Delta PVi$ for controlled quantities PVi, and experimental data for change rates THi for controlled quantities PVi; and the second estimating polynomial equation is derived in advance through multivariate analysis from experimental data for operating quantities MVi from prior to setting value changes, experimental data for change rates THi for controlled quantities PVi, experimental data for change quantities $\Delta PVi$ for controlled quantities PVi, and experimental data for required outputs MUi.

A total energy limiting and controlling method according to the present invention includes an allocated total energy inputting step for receiving allocated total energy information that specifies a quantity of energy used for a control actuator of a plurality of controlled loops Ri (i=1 through n); a controlled quantity change time estimating step for estimating a controlled quantity change time when an operating quantity MVi for an individual controlled loop Ri has been set from a current value to a specific output value; an energy limiting step for estimating a required output MUi that is the operating quantity that is required in order to change a controlled quantity PVi of an individual controlled loop Ri by a quantity that is in accordance with a change in a setting value SPi, over a controlled quantity change time, for calculating a total quantity for energy used, which is the total energy used for each control actuator, from the required output MUi, for retrieving a combination of the required outputs MUi so that the total quantity of energy used does not exceed the allocated total energy, and for setting, as an operating quantity output upper limit value OHi for the individual controlled loop Ri, the required output MUi that is ultimately obtained; and a controlling step for calculating an operating quantity MVi through control calculations upon inputting of the setting value SPi and the control quantity PVi, for executing an upper limit process to limit the operating quantity MVi so as to be no higher than the operating quantity output upper limit value OHi, and for outputting the operating quantity MVi, after the upper limit process, to a control actuator of a corresponding controlled loop Ri.

Moreover, a total energy limiting and controlling method according to the present invention has a total allocated electric power inputting step for receiving total allocated electric power PW information that specifies a quantity of electric power used for a control actuator of a plurality of controlled loops Ri (i=1 through n); a controlled quantity change time estimating step for estimating a controlled quantity change time when an operating quantity MVi for an individual controlled loop Ri has been set from a current value to a specific output value; an electric power limiting step for estimating a required output MUi that is the operating quantity that is required in order to change a controlled quantity PVi of an individual controlled loop Ri by a quantity that is in accordance with a change in a setting value SPi, over a controlled quantity change time, for calculating a total quantity TW for electric power used, which is the total electric power used for each control actuator, from the required output MUi, for retrieving a combination of the required outputs MUi so that the total quantity TW of electric power used does not exceed the total allocated electric power PW, and for setting, as an operating quantity output upper limit value OHi for the individual controlled loop Ri, the required output MUi that is ultimately obtained; and a controlling step for calculating an operating quantity MVi through control calculations upon inputting of the setting value SPi and the control quantity PVi, for executing an upper limit process to limit the operating quantity MVi so as to be no higher than the operating quantity output upper limit value OHi, and for outputting the operating quantity MVi, after the upper limit process, to a control actuator of a corresponding controlled loop Ri.

Furthermore, a total energy limiting and controlling method according to the present invention has an allocated total electric power inputting step for receiving allocated total electric power PW information that specifies a quantity of electric power used for a control actuator of a plurality of controlled loops Ri (i=1 through n); a controlled quantity change quantity calculating step for calculating a change quantity $\Delta PVi$ of a controlled quantity PVi for each controlled loop Ri from a setting value SPi after a change in the individual controlled loop Ri and the controlled quantity PVi prior to changing the setting value; a controlled quantity change rate calculating step for calculating a change rate THi of the controlled quantity PVi from the operating quantity MVi prior to changing the setting value of the individual controlled loop Ri; a heating time calculating step for estimating, from the change quantity $\Delta PVi$ and the change rate THi, a heating time TLi for each individual controlled loop Ri, when the operating quantity MVi for each controlled loop Ri has been set from the current value to a specific output value, and for calculating a heating time TL that is the largest value from among the heating times TLi; a required output estimating step for estimating the required output MUi that is the operating quantity that is required in order to change the controlled quantity PVi of each controlled loop Ri by the change quantity $\Delta PVi$ during the heating time TL; a total electric power use calculating step for calculating, from the required output MUi, the total quantity TW of electric power used, which is the sum of the electric powers used by the individual control actuators; a search processing step for executing processing in the required output estimating step and the total electric power use calculating step, while sequentially changing the heating time TL, to search for combinations of required outputs MUi wherein the total quantity TW of electric power used does not exceed the allocated total electric power PW, and for setting, as an operating quantity output upper limit value OHi for each controlled loop Ri, the required output MUi that is ultimately obtained; and a controlling step for calculating an operating quantity MVi through control calculations upon inputting of the setting value SPi and the control quantity PVi, for executing an upper limit process to limit the operating quantity MVi so as to be no higher than the operating quantity output upper limit value OHi, and for outputting the operating quantity MVi, after the upper limit process, to a control actuator of a corresponding controlled loop Ri.

Given the present invention, it is possible to perform control by estimating the controlled quantity change time when an operating quantity MVi of an individual controlled loop Ri has been changed from the present value to a specific output value, to estimate the required output MUi that is the operating quantity that is required in order to change the controlled quantity PVi of the individual controlled loop Ri by a quantity in accordance with a change in a setting value SPi during the interval of the controlled quantity change time, to calculate, from this required output MUi, the total energy use quantity that is the sum of the energy used by the individual control actuators, to find combinations of required outputs MUi so that the energy use total quantity does not exceed a total allocated energy, and to set, as the operating quantity output upper limit values OHi for the individual controlled loops Ri, the required outputs MUi that are ultimately obtained, to thereby perform control in step-response control (wherein step changes of setting values SPi are performed and a controlling function is used for causing controlled quantities PVi to follow the setting values SPi), for a plurality of control systems, so that the energy use quantity does not exceed the total allocated energy, and so that, insofar as is possible, the tracking performance of the controlled quantity PVi to the setting value SPi is not lost.

Moreover, given the present invention, it is possible to perform control by estimating the controlled quantity change time when an operating quantity MVi of an individual controlled loop Ri has been changed from the present value to a specific output value, to estimate the required output MUi that is the operating quantity that is required in order to change the controlled quantity PVi of the individual controlled loop Ri by a quantity in accordance with a change in a setting value SPi during the interval of the controlled quantity change time, to calculate, from this required output MUi, the total electric power use quantity TW that is the sum of the electric power used by the individual control actuators, to find combinations of required outputs MUi so that the electric power use total quantity TW does not exceed a total allocated electric power PW, and to set, as the operating quantity output upper limit values OHi for the individual controlled loops Ri, the required outputs MUi that are ultimately obtained, to thereby perform control in step-response control, for a plurality of control systems, so that the electric power use quantity does not exceed the total allocated electric power PW, and so that, insofar as is possible, the tracking performance of the controlled quantity PVi to the setting value SPi is not lost.

DETAILED DESCRIPTION OF THE INVENTION

A heating device is used as an example in the description. Because the production of time bands that ultimately produce a surplus availability in the electric power is unavoidable when, for example, timing differences are provided in sequentially starting up a plurality of heating controlling systems, the inventors focused on that surplus availability of energy being the non-efficient portion that delays the completion of the equipment startup. Stated simply, when a step change was performed for the setting value SP, often a state was produced wherein the controlled quantity PV could not be controlled so as to follow the setting value SP.

Additionally, in a heating controlling system wherein there is interference between controlled loops, heating noise is produced, by interference from those controlled loops that are started up later, in those controlled loops wherein the startup has been completed earlier, which is inefficient because of the excess time required in order to stabilize the control. Consequently, the alignment of the "completion timing" so that, insofar as is possible, each controlled loop completes this heating up at the same time, while heating up each controlled loop simultaneously while limiting the total amount of electric power used to be no more than the prescribed value is the most efficient way to start up the equipment.

Given this, storing in advance a typical heating capability for a controlled loop (for example, a heating rate at maximum output) in advance makes it possible to estimate the heating rate when an operating quantity MV is set to a specific output value (for example, the maximum value) from the value it was prior to the change in the setting value (that is, the "present value"), enabling the electric power that is used, corresponding to the estimated time until the completion of heating and the operating quantity output upper limit, to be calculated easily. Conversely, an estimating function for estimating the heating rate when an operating quantity MV is set to a specific output value (for example, the maximum value) from the value it was prior to the change in the setting value (that is, the "present value") may be found based on experimental data, to provide a relatively accurate estimating function.

The calculation of combinations of operating quantity output upper limits that are maximized within a scope wherein the total electric power used is within the total allocated electric power, with the heating completion times for the individual controlled loops being equal to each other, while appropriately correcting the estimated time until the completion of heating, makes it possible to close in on the most efficient method of startup.

In a small controller, both the algorithm storage capacity and the amount of calculation that can be performed in each individual control interval are limited. Consequently, a calculating procedure wherein the heating times when each controlled loop is at the maximum output (when the operating quantity MVi is at the maximum value) are calculated in advance, and of the heating times calculated for the individual loops, the maximum heating time is extracted, to find a situation wherein it is possible to reduce the upper limits of the outputs for the individual loops, where the vicinity of the heating time is caused to be the prescribed time, where an evaluation is made as to whether or not the total is within the total allocated electric power, where if the total allocated electric power is exceeded, then the prescribed time is increased by about several percent, and a situation wherein the upper limits of the power of the individual loops can be reduced are found is preferred.

Figure 1:
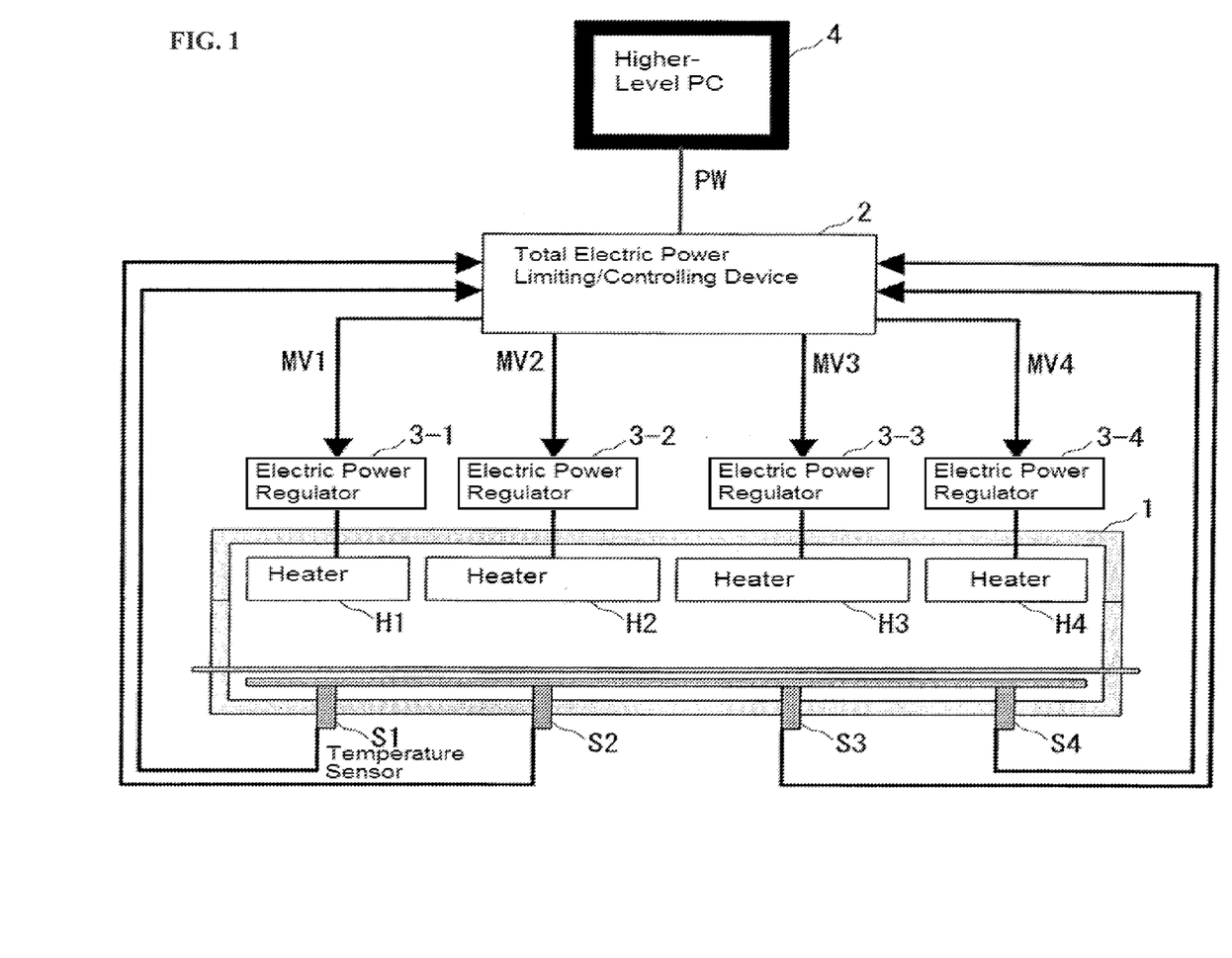
FIG. 1 is a block diagram illustrating a structure of a heating device according to an example of the present invention.

Examples for carrying out the present invention are explained below in reference to the figures. The present example discloses an easy method for estimating the heating rate when narrowing in on any given output upper limit, by storing, in advance, the heating rate at the maximum output, as a typical heating performance. FIG. 1 is a block diagram illustrating a structure of a heating device according to an example of the present invention. The heating device includes a heat treatment furnace 1 for heating an object to be heated; heaters H1 through H4, which are a plurality of control actuators disposed within the heat treatment furnace 1; a plurality of temperature sensors S1 through S4 that measure the temperatures of regions that are heated by the respective heaters H1 through H4; a total electric power limiting/controlling device 2 for calculating the operating quantities MV1 through MV4 from the outputs of the heaters H1 through the H4; and electric power regulators 31 through 34, for providing to the respective heaters H1 through H4, electric power in accordance with the operating quantities MV 1 through MV4 that are outputted from the total electric power limiting/controlling device 2.

Figure 2:
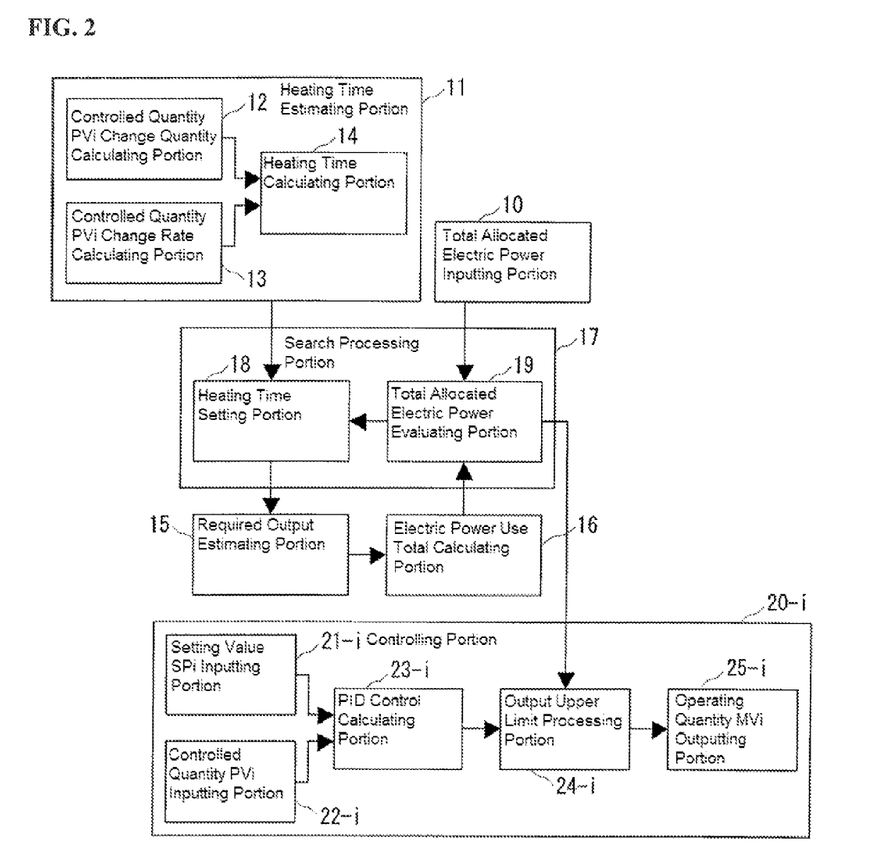
FIG. 2 is a block diagram illustrating a structure of a total electric power limiting/controlling device according to an example of the present invention.

FIG. 2 is a block diagram illustrating the structure of the total electric power limiting/controlling device 2. The total electric power limiting/controlling device 2 has a total allocated electric power inputting portion 10 for receiving, from a higher-level PC 4, information regarding the total allocated electric power PW; a heating time estimating portion 11 for estimating the maximum value TL from among heating times TLi for each individual controlled loop Ri when the operating quantity MVi of each controlled loop Ri is changed from the present value to the maximum value of 100.0% (where i=1 through n, and where the number n of controlled loops is n=4 in the example in FIG. 1); a required output estimating portion 15 for estimating a required output MUi that is the operating quantity that is required in order to change the controlled quantity PVi for each controlled loop Ri by an amount in accordance with the change of the setting value SPi over the heating time TL; an electric power use total calculating portion 16 for calculating the total quantity TW of electric power used, which is the sum of the electric powers used by the individual heaters Hi, from the required outputs MUi for the individual controlled loops Ri; a search processing portion 17 for setting, as the operating quantity output upper limit value OHi for each individual controlled loop Ri, the required output MUi that is ultimately obtained through searching for combinations of required outputs MUi wherein the total quantity TW for the electric power used does not exceed the total allocated electric power PW; and a controlling portion 20-$i$ that is provided for each controlled loop Ri. Note that in the present form of embodiment, the heating time TLi is estimated for the case wherein the operating quantity MVi has been set from the current value to the maximum value of 100.0%; however, this assumption is particularly preferred for a small controller. In principle, the specific output value need not be limited to the maximum value of 100.0%, but rather the use of any suitably large value would be fully effective.

The heating time estimating portion 11 is structured from a controlled quantity PVi change quantity calculating portion 12, a controlled quantity PVi change rate calculating portion 13, and a heating time calculating portion 14. The heating time estimating portion 11 includes the controlled quantity change time estimating means. The search processing portion 17 is structured from a heating time setting portion 18 and a total allocated electric power evaluating portion 19. The required output estimating portion 15, the electric power use total calculating portion 16, and the search processing portion 17 comprise electric power limiting means.

The controlling portion 20-$i$ comprises a setting value SPi inputting portion 21-$i$; a controlled quantity PVi inputting portion 22-$i$, a PID control calculating portion 23-$i$; an output upper limit processing portion 24-$i$; and an operating quantity MVi outputting portion 25-$i$.

Figure 3:
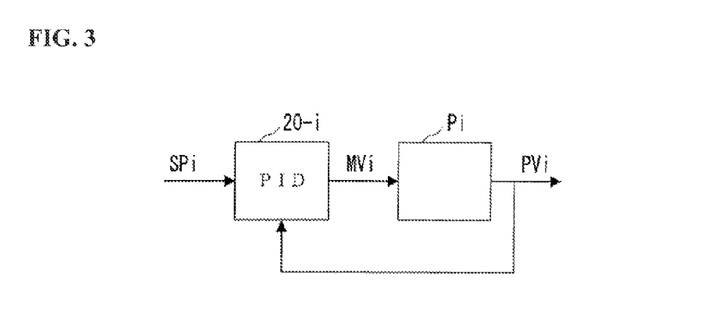
FIG. 3 is a block line diagram illustrating a structure of a controlling system according to an example of the present invention.

FIG. 3 is a block line diagram of a controlling system according to the present form of embodiment. Each controlled loop Ri is structured from a controlling portion 20-$i$ and a controlled object Pi. As will be described below, the controlling portion 20-$i$ calculates the operating quantity MVi from the setting value SPi and the controlled quantity PVi, and outputs that operating quantity MVi to the controlled object Pi. In the example in FIG. 1 the controlled object Pi is a heat treatment furnace 1 that is heated by a heater Hi; however, the actual output destination for the operating quantity MVi is the electric power adjusting device 3-$i$, where electric power commensurate with the operating quantity MVi is outputted from the electric power adjusting device 3-$i$ to the heater Hi.

Figure 4:
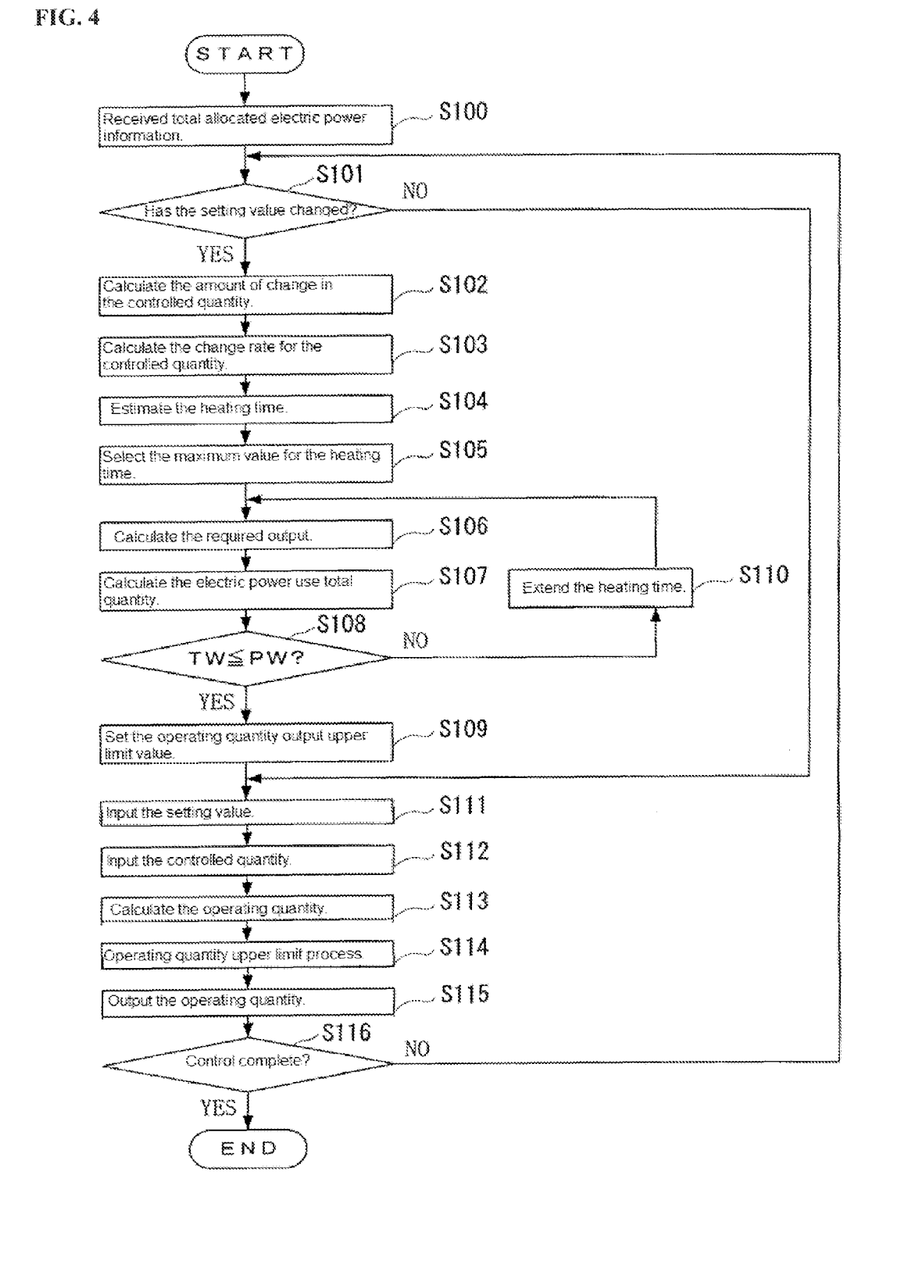
FIG. 4 is a flowchart illustrating the operation of the total electric power limiting/controlling device according to an example of the present invention.

The operation of the total electric power limiting/controlling device 2 according to the present example is explained below. FIG. 4 is a flowchart illustrating the operation of the total electric power limiting/controlling device 2. The total allocated electric power inputting portion 10 receives, from the higher-level PC 4, which is a computer of an electric power demand controlling system for controlling electric power, information pertaining to the total allocated electric power PW that specifies the quantities of electric power used by the heaters (Step S100 in FIG. 4).

When there has been a change in the setting value, by, for example, an operator of the heating device (Step S101: YES), the heating time setting portion 18 of the search processing portion 17 performs, as described below, a process for finding a maximum value TL from among heating times TLi for the individual controlled loops Ri when the operating quantities MVi have been changed from the current values to the maximum value of 100.0%.

First the controlled quantity PVi change quantity calculating portion 12 of the heating time estimating portion 11 obtains the setting value SPi for after the change, for each individual controlled loop Ri, and the control quantity PVi, from prior to the change in the setting value, and uses the equation below to calculate, for each controlled loop Ri, the change quantity ΔPVi of the controlled quantity PVi, for the individual controlled loop Ri, for each individual controlled loop Ri (Step S102):

$$\Delta PVi = SPi - PVi \tag{1}$$

The controlled quantity PVi (the temperature) is measured by a temperature sensor Si, and inputted into the controlling portion 20-$i$. Note that because the control in accordance with the setting value SPi and the controlled quantity PVi is performed in steps beyond Step S102 as well, if the controlled quantity PVi that is inputted into the controlling portion 20-$i$ is defined as being at the point in time of Step S102, then this controlled quantity PVi will be the controlled quantity prior to the change in the setting value. Following this, the controlled quantity PVi change rate calculating portion 13 of the heating time estimating portion 11 obtains the operating quantity MVi for prior to the change in the setting value from the controlling portion 20-$i$ of each individual controlled loop Ri, and calculates, for each controlled loop Ri, the rate (speed) THi of change in the controlled quantity PVi accompanying the change in the setting value SPi, using the following equation (Step S103):

$$THi = THoi\{100.0/(100.0 - MVi)\} \tag{2}$$

Because the control in accordance with the setting value SPi and the controlled quantity PVi is performed in steps beyond Step S103 as well, if the operating quantity MVi that is outputted from the controlling portion 20-$i$ is taken at the point in time of Step S103, then this operating quantity MVi will be the operating quantity prior to the change in the setting value. In Equation (2), THoi is a value that is stored in advance for each controlled loop Ri, and is the change rate value for the controlled quantity PVi when there has been a change from the state wherein the operating quantity MVi=0.0% to the maximum output MVi=100.0% (that is, when the operating quantity increase width is 100.0%). In other words, Equation (2) is a formula for converting the change rate value THoi with the operating quantity increase width (100.0−MVi). In the present form of embodiment the explanation is of an example of a heating device, so the change rate THi of the controlled quantity PVi is a heating rate (sec/° C.).

Following this, the heating time calculating portion 14 of the heating time estimating portion 11 estimates, for each controlled loop Ri, the heating time TLi that is the controlled quantity change time that is required in order to change the controlled quantity PVi of the individual controlled loop Ri by ΔPVi, from the change rate THi of the controlled quantity PVi and the change quantity ΔPVi, using the following equation (Step S104):

$$TLi = THi \Delta PVi \quad (3)$$

Following this, the heating time calculating portion 14 selects the maximum value TL from among the heating times TLi of the individual controlled loops Ri (Step S105):

$$TL = \max(TLi) \quad (4)$$

In Equation (4) max ( ) is the maximum value selecting function. The heating time TL can be estimated through the processes in Step S102 through S105, above.

Following this, the total allocated electric power evaluating portion 19 of the search processing portion 17 performs the process for finding the electric power use TW for all of the heaters when the controlled quantity PVi is changed by the change quantity ΔPVi over the heating time TL, doing so as follows.

First the required output estimating portion 15 obtains the operating quantity MVi from prior to changing the setting value for each individual controlled loop Ri, and calculates, for each individual controlled loop Ri, using the following equation, the required output MUi, which is the operating quantity that is required in order to change the controlled quantity PVi of the individual controlled loop Ri by the change quantity ΔPVi over the heating time TL (Step S106):

$$MUi = \{100.0 \; THoi/(TL/\Delta PVi)\} + MVi \quad (5)$$

Equation (5) is an equation that is obtained through replacing the 100.0 in the numerator in Equation (2) with MUi, and replacing THi with TL/ΔPVi, and then solving for MUi.

Following this, the electric power use total calculating portion 16 calculates, using the following equation, the electric power use total quantity TW, which is the sum of the electric power used by each of the heaters Hi, from the required output MUi for each individual controlled loop Ri (Step S107):

[Equation 6]

$$TW = \sum_{i=1}^{n} \{CTmi(MUi/100.0)\} \quad (6)$$

In Equation (6), CTmi is a value that is stored in advance for each individual controlled loop Ri, and is the value for the electric power used by a heater Hi when the operating quantity MVi is the maximum value 100.0%. When TW≤PW, that is, when the electric power use total quantity TW does not exceed the total allocated electric power PW (Step S108: YES), then the total allocated electric power evaluating portion 19 of the search processing portion 17 sets the required power MUi of each of the controlled loops Ri as the operating quantity output upper limit value OHi for the respective controlled loop Ri (Step S109).

Moreover, if TW>PW, that is, if the electric power use total quantity TW exceeds the total allocated electric power PW, then the total allocated electric power evaluating portion 19 sends an instruction to the heating time setting portion 18 to extend the heating time TL to, for example, 1.05 times the current value (Step S110), and processing returns to Step S106. In this way, the processes in Step S106 through S108 and S110 are repeated until the electric power use total quantity TW is within the total allocated electric power PW.

Following this, the controlling portion 20-$i$ calculates the operating quantity MVi for the controlled loop Ri as shown below. The setting value SPi is inputted into the PID control calculating portion 23-$i$ through the setting value SPi inputting portion 21-$i$ (Step S111). The controlled quantity PVi is inputted into the PID control calculating portion 23-$i$ through the controlled quantity PVi inputting portion 22-$i$ (Step S112).

The PID control calculating portion 23-$i$ calculates the operating quantity MVi by performing the PID control calculations as per the following transfer function based on the setting value SPi and the controlled quantity PVi (Step S113):

$$MVi = (100/PVi)\{1 + (1/TIis) + TDis\}(SPi - PVi) \quad (7)$$

PBi is a proportionality band, TIi is an integrating time, TDi is a differentiating time, and is the Laplace operator.

The output upper limit processing portion 24-$i$ performs an upper limit process on the operating quantity MVi as per the following equation (Step S114):

$$\text{If } MVi > OHi \text{ then } MVi = OHi \quad (8)$$

That is, the output upper limit processing portion 24-$i$ performs an upper limit process to make the operating quantity MVi=OHi if the operating quantity MVi is greater than the operating quantity output upper limit value OHi.

The operating quantity MVi outputting portion 25-$i$ outputs to the controlled object (where the actual output destination is the electric power adjusting device 3-$i$) the operating quantity MVi that has been subjected to the upper limit processing by the output upper limit processing portion 24-$i$ (Step S115). A controlling portion 20-$i$ is provided for each individual controlled loop Ri, so the processes in Step S111 through S115 are executed for each controlled loop Ri.

The total electric power limiting/controlling device 2 performs the processes in Step S101 through S115, as described above, at predetermined intervals until, for example, control is terminated by a user instruction (Step S116: YES). Note that the processes in Step S102 through S110 are performed when at least one of the setting values SPi for a controlled loop Ri has been changed.

Figure 5:
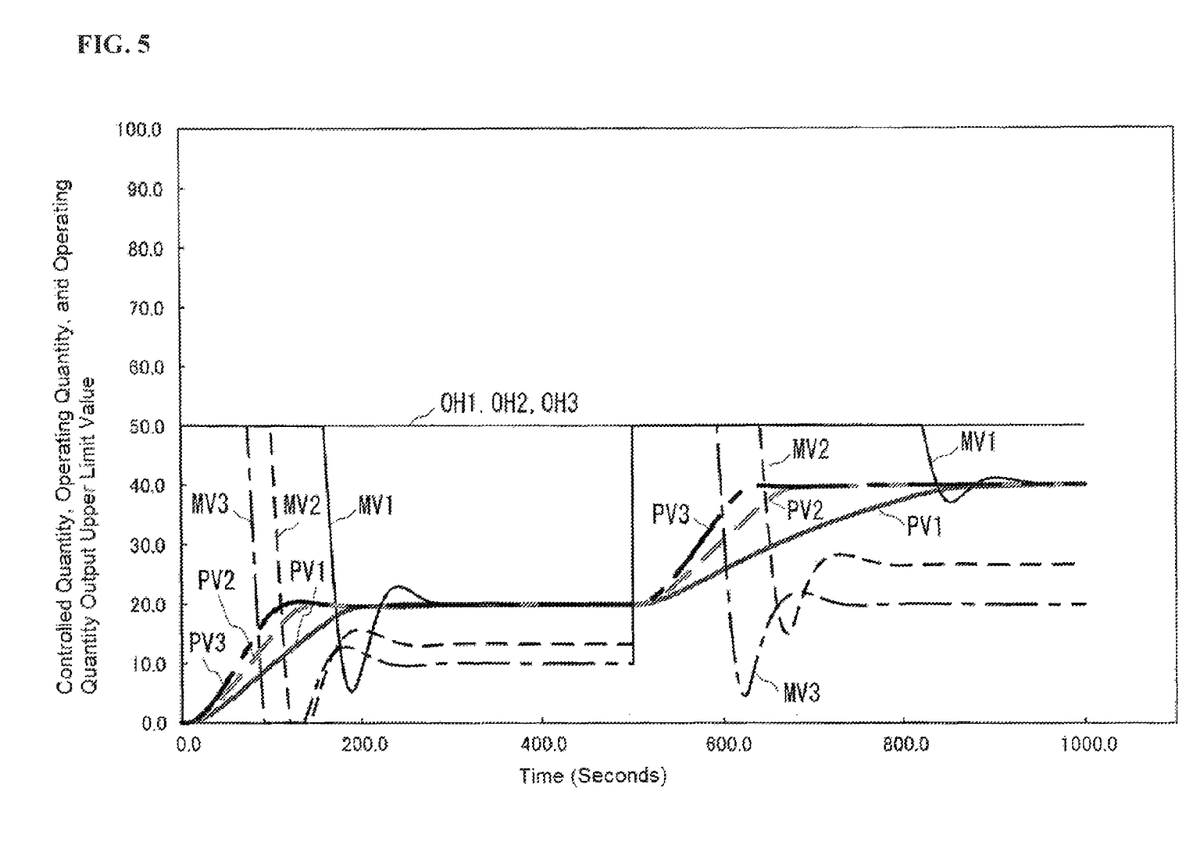
FIG. 5 is a diagram illustrating an operating example of a conventional heating device.
Figure 6:
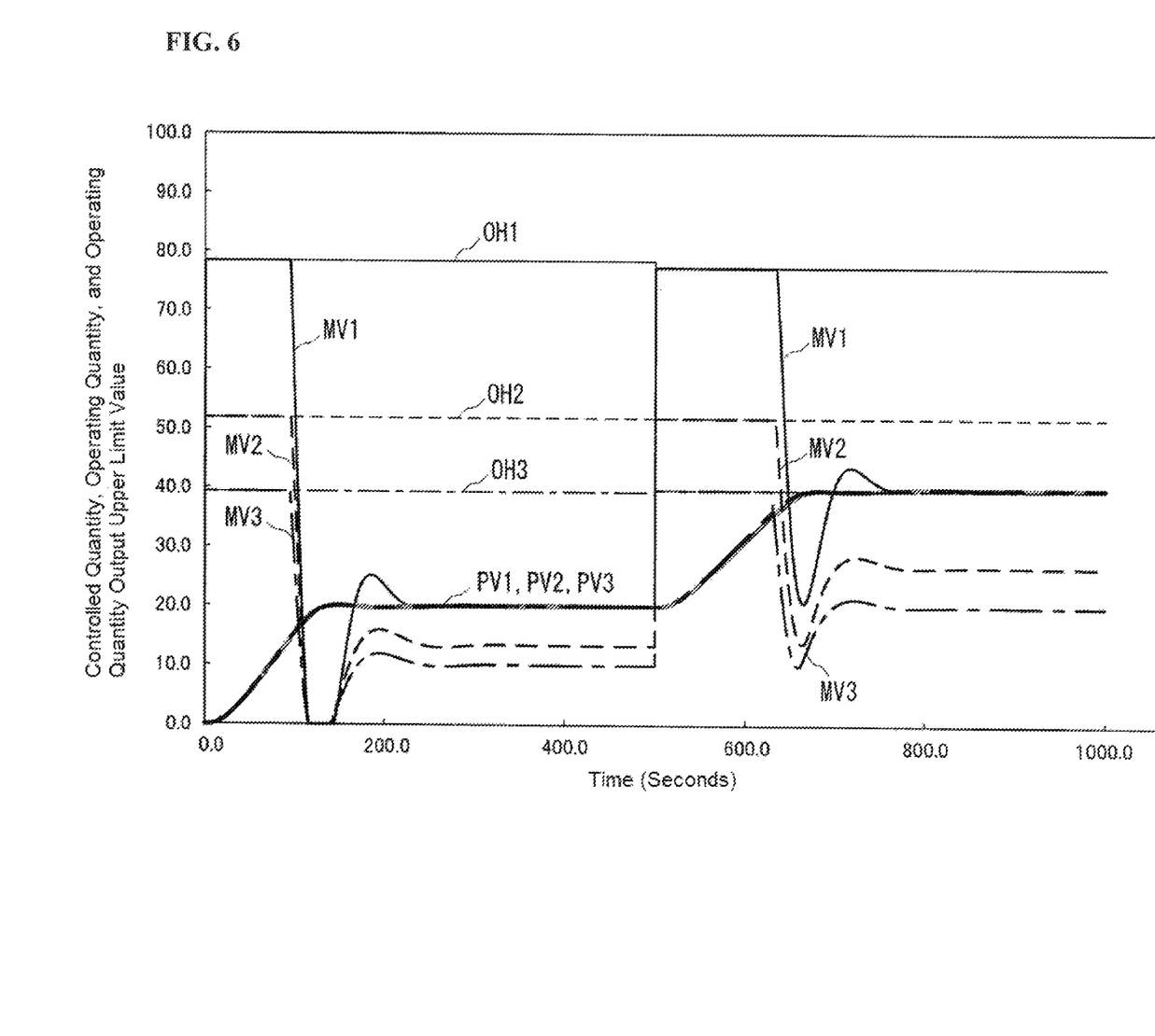
FIG. 6 is a diagram illustrating an operating example of a heating device according to an example of the present invention.

An example of operation of the heating device according to the present form of embodiment is shown next in FIG. 5 and FIG. 6. In consideration of ease in understanding, an operating example of a controlling system wherein n=3 loops is shown in FIG. 5 and FIG. 6. FIG. 5 shows an example of operation of a conventional heating device wherein control is performed with the output upper limit for each heater set uniformly to 50% in a situation wherein, for a 600 W heater, with a total of three individual heaters, heater H1 at 100 W, heater H2 at 200 W, and heater H3 at 300 W, with a total allocated electric power PW of 300 W (50% of the total heater capacity). The vertical axes show the controlled quantity PVi, the operating quantity MVi, and the operating quantity output upper limit value OHi, each shown on a 0-100 scale. The units for the controlled quantity PVi are ° C., and the units for the operating quantity MVi and the operating quantity output upper limit value OHi are percentages.

Here the setting values SP1 through SP3 are changed simultaneously to 20.0° C. at the 0.0 seconds time mark, and, after heating and stabilization, they are changed simultaneously to 40.0° C. at the 500.0 seconds time mark. Because there are differences in the heating capabilities of the individual heaters, when the operating quantity output upper limit values OH1 through OH3 are all 50%, the amount of time until the completion of heating for the control systems of the three loops is determined by the controlled quantity PV1, which is the slowest, clearly reducing the heating efficiency.

In particular, after the heating has been completed for the controlled quantities PV2 and PV3, the operating quantity MV1 is limited despite there being surplus available total electric power.

FIG. 6 shows an example of operation of a heating device according to the present form of embodiment under these same conditions. Here the change rate value THo1=10.12 sec/° C. for the controlled quantity PV1, the change rate value THo2=6.68 sec/° C. for the controlled quantity PV2, and the change rate value THo3=5.06 sec/° C. for the controlled quantity PV3 have been set in advance as values showing the differences in the heating capabilities of the individual heaters. The values for these change rate values THo1 through THo3 need not be highly precise quantitative values, and in practice the accuracy will be in a fully practical range as long as the accuracy is to a degree wherein the ratios of the individual change rate values roughly match the ratios of the heating capabilities of the individual heaters.

In the present example, the operating quantity output upper limit values OH1 through OH3 have been set considering the heating performances of the individual heaters, and thus the times required to complete the heating are essentially the same for the controlling systems in each of the three loops. Because there is no controlling system wherein the heating is extremely slow, the heating efficiency is improved substantially. Note that the operating quantity output values OH1 through OH3 are modified even at the 500.0 second time mark, but the scope of change is small in terms of principle.

In addition, in the present example the operating quantities MV1 through MV3 are not changed directly, but rather the operating quantity output upper limit values OH1 through OH3 are changed, so no extraneous variation is produced in the operating quantities MV1 through MV3. That is, this makes it possible to obtain a control-response waveform that is not unnatural, adversely affecting the PID control calculations.

Note that the processing sequence in the total electric power limiting/controlling device 2 in the present invention need not, of course, be as illustrated in FIG. 4. Moreover, while in the example in FIG. 4 the total allocated electric power PW information was received only once, the higher-level PC 4 may send information as necessary, and the values for the total allocated electric power PW may be updated constantly thereby.

Another example according to the present invention is explained next. While in the above example a simple method was used for estimating and calculating the change rate THi of the controlled quantity PVi, in the present example a method that further increases the estimation/calculation precision of the change rate THi of the controlled quantity PVi will be presented, taking into consideration the non-linearity of the heating capabilities.

The structure of the total electric power limiting/controlling device 2 and the flow of processing in the present example are identical to those in the previous example, and so the codes from FIG. 1 through FIG. 4 will be used in the explanation.

The operation of the total electric power limiting/controlling device 2 according to the present example is explained below. The processes in Step S100 through S102 in FIG. 4 are identical to those in the above example.

Following this, the controlled quantity PVi change rate calculating portion 13 of the heating time estimating portion 11 in the present example uses the equation below to calculate, for each controlled loop Ri, the change rate THi of the controlled quantity PVi from the operating quantity MVi from prior to changing the setting values for each of the individual controlling loops Ri and from the change quantity ΔPVi of the controlled quantity PVi, using an estimating polynomial function f( ) that has been set in advance (Step S103):

$$THi = f(MVi, OHi=100.0, \Delta PVi) \tag{9}$$

Here the operating quantity output upper limit value OHi that is applied to the estimating polynomial function f( ) is 100.0%. The method for finding the estimating polynomial function f( ) is explained next. The user that sets the estimating polynomial function f( ) collects data for analysis, which is experimental data of a predetermined number of experiments pertaining to the operating quantities MVi from prior to the setting values being changed, the operating quantity output upper limit values OHi, the change quantities ΔPVi of the controlled quantities PVi, and the change rates THi of the controlled quantities PVi. One example of these analysis data is shown in Table 1.

TABLE 1

| ΔPV1 | OH1 | MV1 | TH1 |
|------|-----|-----|------|
| 10 | 90 | 37.78 | 17.3 |
| 10 | 100 | 37.78 | 13.7 |
| 20 | 80 | 37.78 | 29.35 |
| 20 | 90 | 37.78 | 21.9 |
| 40 | 100 | 37.78 | 22.17 |
| 60 | 80 | 37.78 | 43.35 |
| 60 | 100 | 37.78 | 25.35 |
| 10 | 80 | 40.81 | 25.1 |
| 20 | 80 | 40.81 | 32.45 |
| 30 | 70 | 40.81 | 55.23 |
| 10 | 100 | 43.85 | 15.8 |
| 20 | 100 | 43.85 | 19.8 |
| 40 | 100 | 43.85 | 25.38 |
| 10 | 70 | 46.93 | 51.9 |
| 10 | 90 | 46.93 | 22 |
| 20 | 90 | 46.93 | 28.5 |
| 30 | 80 | 46.93 | 46.57 |
| 10 | 80 | 50.19 | 36 |
| 10 | 90 | 50.19 | 24.2 |
| 20 | 70 | 50.19 | 79.5 |
| 20 | 80 | 50.19 | 46.35 |

The estimating polynomial function f( ) is calculated for each controlled loop Ri through performing multivariate analysis such as multiple regression analysis or support vector regression (SVR) for the analysis data. The estimating polynomial function f( ) may be placed in the controlled quantity PVi change rate calculating portion 13 for each individual controlled loop Ri. The estimating polynomial function f found from the analysis data in Table 1 is shown below. Here the SVR method was used as the multivariate analysis method.

$TH1 = 0.27392 \times \{(\Delta PV1-21.818) \times 0.06279\}^3 +$
$0.98236 \times \{(\Delta PV1-21.818) \times 0.06279\}^2 \times (OH1-82.727) \times 0.04717 - 1.0102 \times \{(\Delta PV1-21.818) \times 0.06279\}^2 \times (MV1-41.224) \times 0.09649 - 2.1976 \times \{(\Delta PV1-21.818) \times 0.06279\}^2 + 2.9847 \times (\Delta PV1-21.818) \times 0.06279 \times \{(OH1-82.727) \times 0.04717\}^2 - 3.5615 \times (\Delta PV1-21.818) \times 0.06279 \times (OH1-82.727) \times 0.04717 \times (MV1-41.224) \times 0.09649 - 7.4233 \times (\Delta PV1-21.818) \times 0.06279 \times (OH1-82.727) \times 0.04717 + 0.90789 \times (\Delta PV1-21.818) \times 0.06279 \times (MV1-41.224) \times 0.09649 \times (MV1-41.224) \times 0.09649 + 3.3854 \times (\Delta PV1-21.818) \times 0.06279 \times (MV1-41.224) \times 0.09649 + 8.7284 \times (\Delta PV1-21.818) \times 0.06279 - 9.6209 \times \{(OH1-82.727) \times 0.04717\}^3 + 15.583 \times \{(OH1-82.727) \times 0.04717\}^2 \times (MV1-41.224) \times 0.09649 + 16.332 \times \{(OH1-82.727) \times 0.04717\}^2 - 7.6565 \times (OH1-82.727) \times 0.04717 \times \{(MV1-41.224) \times 0.09649\}^2 - 17.689 \times (OH1-82.727) \times 0.04717 \times (MV1-41.224) \times 0.09649 - 20.277 \times (OH1-82.727) \times$ $$0.04717 + 2.3928 \times \{(MV1-41.224) \times 0.09649\}^3 + 3.1479 \times \{(MV1-41.224) \times 0.09649\}^2 + 9.8793 \times (MV1-41.224) \times 0.09649 + 30.529 \quad (10)$$

Following this, the processes in Step S104 and S105 in FIG. 4 are identical to those in the first form of embodiment. The required output estimating portion 15 in the present form of embodiment uses the following equation to calculate, for each controlled loop Ri, the required output MUi from the operating quantity MVi from prior to the change in the setting value for each individual controlled loop Ri, the change quantity ΔPVi for the control quantity PVi, and the heating time TL, using an estimating polynomial function g( ) that has been set in advance (Step S106):

$$MUi = (MVi, THi=TL, \Delta PVi) \quad (11)$$

Here the change rate of the controlled quantity PVi applied in the estimating polynomial function g( ) is THi=TL. In finding the estimating polynomial function g( ), analysis data, which is experimental data of a predetermined number of experiments regarding the relationships between the operating quantity MVi prior to the change in the setting value, the change rate THi of the controlled quantity PVi, the change quantity ΔPVi of the controlled quantity PVi, and the required output MUi (the operating quantity output upper limit value OHi), may be collected, and multivariate analysis, such as multiple regression analysis or SVR, may be performed on the analysis data. The analysis data may be the same as the data for finding the estimating polynomial function f( ). In addition, the estimating polynomial functions g( ) that are found for each of the controlled loops Ri may be set in the required output estimating portion 15.

The processes in Step S107 through S116 in FIG. 4 are identical to those in the previous example.

Following this, the experimental data below, collected separately from the analysis data in Table 1, were used to confirm the repeatability (the estimation accuracy) of the change rate TH1 of the controlled quantity PV1.

TABLE 2

| Δ PV1 | OH1 | MV1 | TH1 |
|---|---|---|---|
| 10 | 70 | 37.78 | 32.7 |
| 10 | 80 | 37.78 | 22.7 |
| 10 | 90 | 37.78 | 17.3 |
| 10 | 100 | 37.78 | 13.7 |
| 20 | 70 | 37.78 | 42.25 |
| 20 | 80 | 37.78 | 29.35 |
| 20 | 90 | 37.78 | 21.9 |
| 20 | 100 | 37.78 | 17.15 |
| 30 | 70 | 37.78 | 48.37 |
| 30 | 80 | 37.78 | 33.77 |
| 30 | 90 | 37.78 | 25.4 |
| 30 | 100 | 37.78 | 20 |
| 40 | 70 | 37.78 | 53.7 |
| 40 | 80 | 37.78 | 37.12 |
| 40 | 90 | 37.78 | 27.97 |
| 40 | 100 | 37.78 | 22.17 |
| 50 | 80 | 37.78 | 40.24 |
| 50 | 90 | 37.78 | 30.16 |
| 50 | 100 | 37.78 | 23.84 |
| 60 | 80 | 37.78 | 43.35 |
| 60 | 90 | 37.78 | 32.17 |
| 60 | 100 | 37.78 | 25.35 |
| 10 | 70 | 40.81 | 37.6 |
| 10 | 80 | 40.81 | 25.1 |
| 10 | 90 | 40.81 | 18.6 |
| 10 | 100 | 40.81 | 14.7 |
| 20 | 70 | 40.81 | 48.25 |
| 20 | 80 | 40.81 | 32.45 |
| 20 | 90 | 40.81 | 23.75 |
| 20 | 100 | 40.81 | 18.45 |
| 30 | 70 | 40.81 | 55.23 |

TABLE 2-continued

| Δ PV1 | OH1 | MV1 | TH1 |
|---|---|---|---|
| 30 | 80 | 40.81 | 37.23 |
| 30 | 90 | 40.81 | 27.5 |
| 30 | 100 | 40.81 | 21.43 |
| 40 | 70 | 40.81 | 61.7 |
| 40 | 80 | 40.81 | 41.05 |
| 40 | 90 | 40.81 | 30.3 |
| 40 | 100 | 40.81 | 23.65 |
| 50 | 80 | 40.81 | 44.6 |
| 50 | 90 | 40.81 | 32.66 |
| 50 | 100 | 40.81 | 25.48 |
| 10 | 70 | 43.85 | 43.7 |
| 10 | 80 | 43.85 | 27.9 |
| 10 | 90 | 43.85 | 20.1 |
| 10 | 100 | 43.85 | 15.8 |
| 20 | 70 | 43.85 | 55.75 |
| 20 | 80 | 43.85 | 36.2 |
| 20 | 90 | 43.85 | 26 |
| 20 | 100 | 43.85 | 19.8 |
| 30 | 70 | 43.85 | 64.07 |
| 30 | 80 | 43.85 | 41.47 |
| 30 | 90 | 43.85 | 29.93 |
| 30 | 100 | 43.85 | 23.03 |
| 40 | 70 | 43.85 | 72.33 |
| 40 | 80 | 43.85 | 45.75 |
| 40 | 90 | 43.85 | 32.95 |
| 40 | 100 | 43.85 | 25.38 |
| 10 | 70 | 46.93 | 51.9 |
| 10 | 80 | 46.93 | 31.5 |
| 10 | 90 | 46.93 | 22 |
| 10 | 100 | 46.93 | 16.8 |
| 20 | 70 | 46.93 | 65.7 |
| 20 | 80 | 46.93 | 40.7 |
| 20 | 90 | 46.93 | 28.5 |
| 20 | 100 | 46.93 | 21.4 |
| 30 | 70 | 46.93 | 76.03 |
| 30 | 80 | 46.93 | 46.57 |
| 30 | 90 | 46.93 | 32.8 |
| 30 | 100 | 46.93 | 24.8 |
| 10 | 70 | 50.19 | 63.3 |
| 10 | 80 | 50.19 | 36 |
| 10 | 90 | 50.19 | 24.2 |
| 10 | 100 | 50.19 | 18.2 |
| 20 | 70 | 50.19 | 79.5 |
| 20 | 80 | 50.19 | 46.35 |
| 20 | 90 | 50.19 | 31.45 |
| 20 | 100 | 50.19 | 23.2 |

Figure 7:
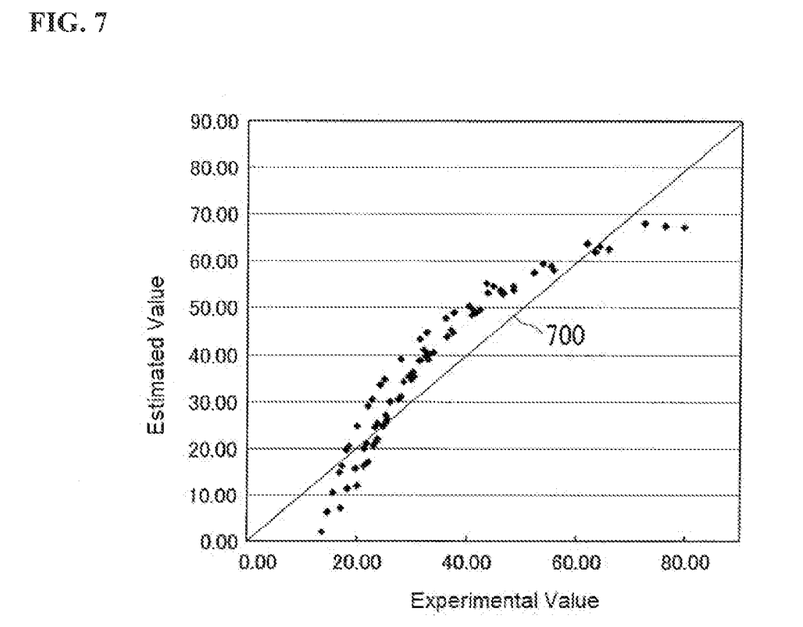
FIG. 7 is a diagram illustrating the results of estimating the controlled quantity change rate using a first-order polynomial function.

FIG. 7 is a diagram illustrating the estimation results of the change rate TH1 using a first-order polynomial function, where the horizontal axis shows the experimental values for the change rates TH1 and the vertical axis shows the estimated values for the change rates TH1. The fact that there are not very many plot points on the line 700 in FIG. 7 shows that the estimation accuracy of the change rates TH1 is low.

Figure 8:
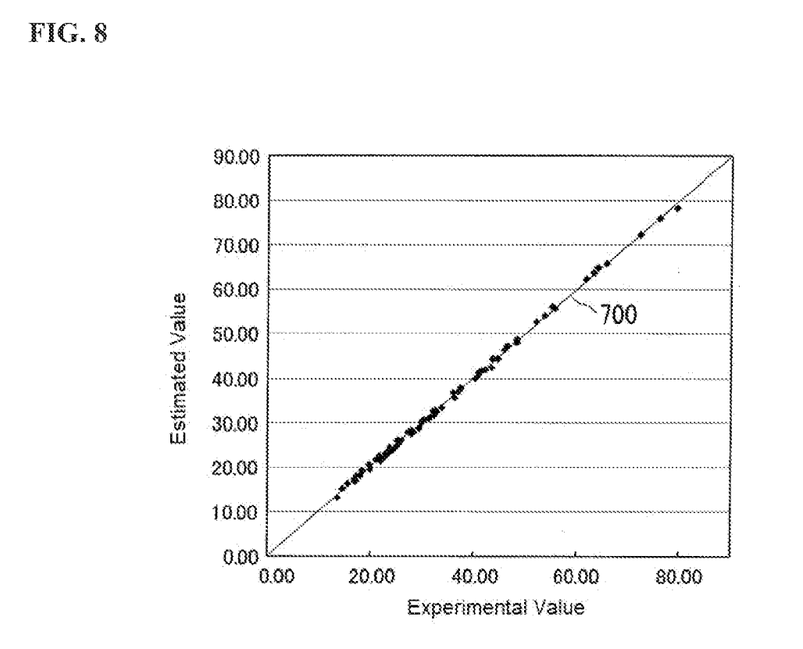
FIG. 8 is a diagram illustrating the results of estimating the controlled quantity change rate using a third-order polynomial function.

FIG. 8 is a diagram illustrating the results of estimating the change rate using a third-order polynomial function. From FIG. 8 it can be understood that the plot points are essentially on the line 700 and the estimation accuracy of the change rates TH1 is high. Consequently, it can be seen that if the order of the estimating polynomial function is raised to the third order, the change rate THi of the controlled quantity PVi can be estimated with high accuracy by inputting the operating quantity MVi from prior to the change in the setting value, the operating quantity output upper limit value OHi, and the change quantity ΔPVi of the controlled quantity PVi. Moreover, FIG. 8 shows that the correlation with the four variables, namely the operating quantity MVi prior to the change in the setting value, the operating quantity output upper limit value OHi, the change quantity ΔPVi of the controlled quantity PVi, and the change rate THi of the controlled quantity PVi, is adequate. That is, FIG. 8 shows that the estimating polynomial functions f( ) and g( ) are of a practical level.

In this way, the present example enables an improvement in the estimation/calculation accuracy of the change rate THi of the controlled quantity PVi and the required output MUi, thus making it possible to improve the accuracy of the heating control relative to the above example.

Note that while a heating device was used as an example in the explanations in the above examples, the present invention may instead be applied, for example, to cooling equipment for controlling the cooling temperature of an object.

While in the above examples the operating quantity output upper limit value OHi was calculated based on an electric power quantity, there is no limitation thereto, and instead the calculation may be based on a fuel use quantity. That is, in the present invention, a form wherein the physical quantity known as "electric power," which was used in the total electric power limiting/controlling device 2 in the above examples is replaced with "energy" or "power."

A structure of a total energy limiting/controlling device wherein the physical quantity known as "electric power" that was used in the total electric power limiting/controlling device 2 in the above examples has been replaced with "energy."

Figure 9:
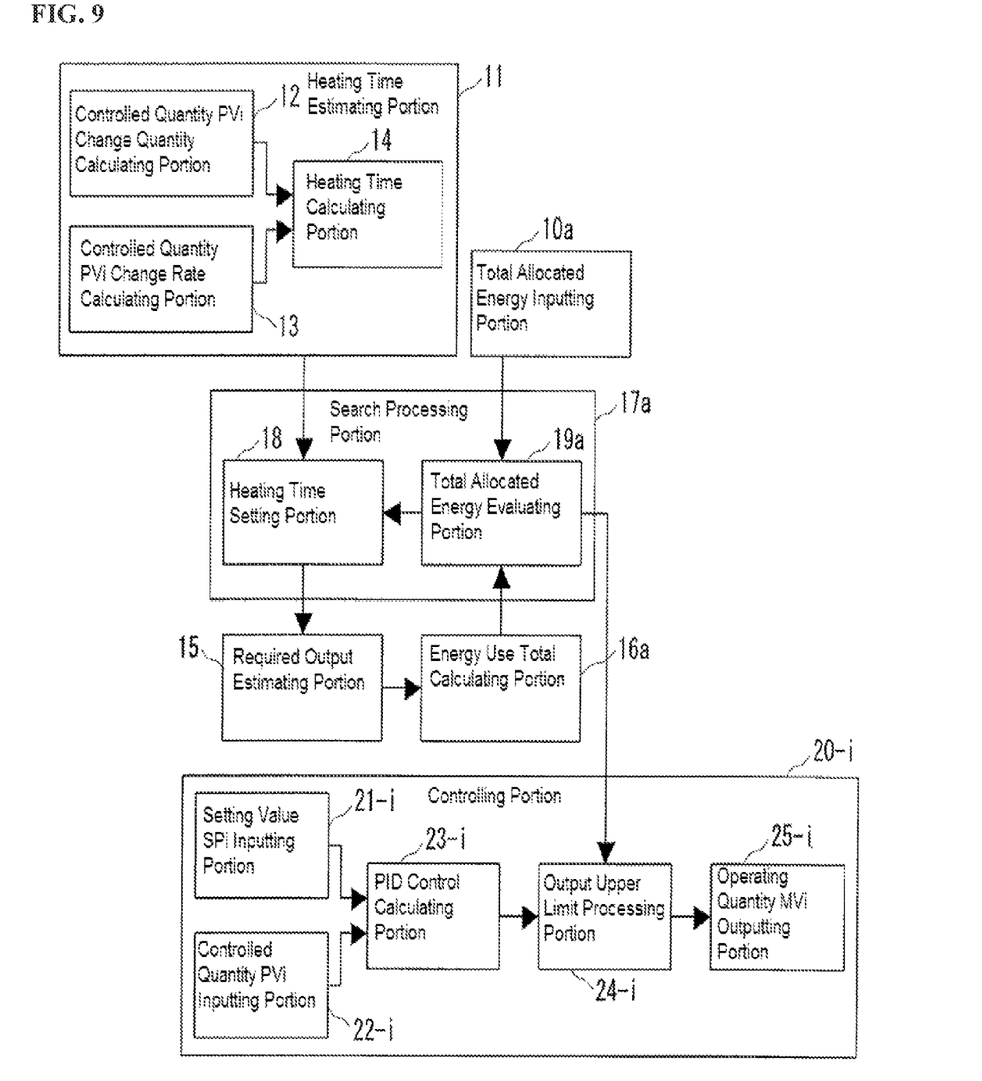
FIG. 9 is a block diagram illustrating a structure of a total energy limiting/controlling device according to another example of the present invention.

The total energy limiting stress controlling device in FIG. 9 is structured from a total allocated energy inputting portion 10a, a heating time estimating portion 11, a required output estimating portion 15, an energy use total calculating portion 16a, a search processing portion 17a, and a controlling portion 20-i that is provided for each controlled loop Ri. The search processing portion 17a is structured from a heating time setting portion 18 and a total allocated energy evaluating portion 19a. The structure of this total energy limiting/controlling device corresponds to the replacement of the "electric power" in the previous examples with "energy," and thus detailed explanations are omitted.

The total electric power limiting/controlling device and total energy limiting/controlling device explained in the above examples may be embodied through a computer that is equipped with a CPU, a storage device, and an interface, combined with a program for controlling these hardware resources. The CPU executes the processes explained in the other examples, in accordance with a program that is stored in the memory device.

The present invention can be applied to control devices and control methods for multiple control systems provided with a plurality of controlled loops.

The invention claimed is:

1. A total energy limiting and controlling device comprising:
 a total allocated energy inputting device receiving total allocated energy information that specifies a quantity of energy used for a control actuator of a plurality of controlled loops Ri (i=1 through n);
 a controlled quantity change time estimator estimating a controlled quantity change time when an operating quantity MVi for an individual controlled loop Ri has been set from a current value to a specific output value;
 an energy limiting device estimating a required output MUi that is the operating quantity that is required in order to change a controlled quantity PVi of an individual controlled loop Ri by a quantity that is in accordance with a change in a setting value SPi, over a controlled quantity change time, for calculating a total quantity for energy used, which is the total energy used for each control actuator, from the required output MUi, for retrieving a combination of the required outputs MUi so that the total quantity of energy used does not exceed the allocated total energy, and for setting, as an operating quantity output upper limit value OHi for the individual controlled loop Ri, the required output MUi that is ultimately obtained; and
 a controller calculating an operating quantity MVi, provided for each controlled loop Ri, through control calculations upon inputting of the setting value SPi and the control quantity PVi, for executing an upper limit process to limit the operating quantity MVi so as to be no higher than the operating quantity output upper limit value OHi, and for outputting the operating quantity MVi, after the upper limit process, to a control actuator of a corresponding controlled loop Ri.

2. A total electric power limiting and controlling device comprising:
 a total allocated electric power inputting device receiving total allocated electric power PW information that specifies a quantity of electric power used for a control actuator of a plurality of controlled loops Ri (i=1 through n);
 a controlled quantity change time estimator estimating a controlled quantity change time when an operating quantity MVi for an individual controlled loop Ri has been set from a current value to a specific output value;
 an electric power limiting device estimating a required output MUi that is the operating quantity that is required in order to change a controlled quantity PVi of an individual controlled loop Ri by a quantity that is in accordance with a change in a setting value SPi, over a controlled quantity change time, for calculating a total quantity TW for electric power used, which is the total electric power used for each control actuator, from the required output MUi, for retrieving a combination of the required outputs MUi so that the total quantity TW of electric power used does not exceed the total allocated electric power PW, and for setting, as an operating quantity output upper limit value OHi for the individual controlled loop Ri, the required output MUi that is ultimately obtained; and
 a controller calculating an operating quantity MVi, provided for each controlled loop Ri, through control calculations upon inputting of the setting value SPi and the control quantity PVi, for executing an upper limit process to limit the operating quantity MVi so as to be no higher than the operating quantity output upper limit value OHi, and for outputting the operating quantity MVi, after the upper limit process, to a control actuator of a corresponding controlled loop Ri.

3. A total energy limiting and controlling method comprising:
 an allocated total energy inputting step receiving allocated total energy information that specifies a quantity of energy used for a control actuator of a plurality of controlled loops Ri (i=1 through n);
 a controlled quantity change time estimating step estimating a controlled quantity change time when an operating quantity MVi for an individual controlled loop Ri has been set from a current value to a specific output value;
 an energy limiting step estimating a required output MUi that is the operating quantity that is required in order to change a controlled quantity PVi of an individual controlled loop Ri by a quantity that is in accordance with a change in a setting value SPi, over a controlled quantity change time, for calculating a total quantity for energy used, which is the total energy used for each control actuator, from the required output MUi, for retrieving a combination of the required outputs MUi so that the total quantity of energy used does not exceed the allocated total energy, and for setting, as an operating quantity output upper limit value OHi for the individual controlled loop Ri, the required output MUi that is ultimately obtained; and a controlling step calculating an operating quantity MVi through control calculations upon inputting of the setting value SPi and the control quantity PVi, for executing an upper limit process to limit the operating quantity MVi so as to be no higher than the operating quantity output upper limit value OHi, and for outputting the operating quantity MVi, after the upper limit process, to a control actuator of a corresponding controlled loop Ri.

4. A total electric power limiting and controlling method comprising:

a total allocated electric power inputting step receiving total allocated electric power PW information that specifies a quantity of electric power used for a control actuator of a plurality of controlled loops Ri (i=1 through n);

a controlled quantity change time estimating step estimating a controlled quantity change time when an operating quantity MVi for an individual controlled loop Ri has been set from a current value to a specific output value;

an electric power limiting step estimating a required output MUi that is the operating quantity that is required in order to change a controlled quantity PVi of an individual controlled loop Ri by a quantity that is in accordance with a change in a setting value SPi, over a controlled quantity change time, for calculating a total quantity TW for electric power used, which is the total electric power used for each control actuator, from the required output MUi, for retrieving a combination of the required outputs MUi so that the total quantity TW of electric power used does not exceed the total allocated electric power PW, and for setting, as an operating quantity output upper limit value OHi for the individual controlled loop Ri, the required output MUi that is ultimately obtained; and a controlling step calculating an operating quantity MVi through control calculations upon inputting of the setting value SPi and the control quantity PVi, executing an upper limit process to limit the operating quantity MVi so as to be no higher than the operating quantity output upper limit value OHi, and outputting the operating quantity MVi, after the upper limit process, to a control actuator of a corresponding controlled loop Ri.

* * * * *